United States Patent
Nishimura et al.

(10) Patent No.: US 11,216,676 B2
(45) Date of Patent: Jan. 4, 2022

(54) INFORMATION PROCESSING SYSTEM AND INFORMATION PROCESSING METHOD

(71) Applicant: TOYOTA JIDOSHA KABUSHIKI KAISHA, Toyota (JP)

(72) Inventors: Kazuya Nishimura, Okazaki (JP); Naoki Uenoyama, Nisshin (JP); Hirofumi Kamimaru, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 197 days.

(21) Appl. No.: 16/539,485

(22) Filed: Aug. 13, 2019

(65) Prior Publication Data
US 2020/0125870 A1 Apr. 23, 2020

(30) Foreign Application Priority Data
Oct. 23, 2018 (JP) .............................. JP2018-199414

(51) Int. Cl.
| | | |
|---|---|---|
| G06K 9/00 | (2006.01) |
| G08G 1/052 | (2006.01) |
| G08G 1/01 | (2006.01) |
| H04L 29/08 | (2006.01) |
| H04W 4/44 | (2018.01) |

(52) U.S. Cl.
CPC ....... *G06K 9/00825* (2013.01); *G08G 1/0112* (2013.01); *G08G 1/0129* (2013.01); *G08G 1/052* (2013.01); *H04L 67/12* (2013.01); *H04W 4/44* (2018.02)

(58) Field of Classification Search
CPC ............. G06K 9/00825; G08G 1/0112; G08G 1/0129; G08G 1/052; H04L 67/12; H04W 4/44
See application file for complete search history.

(56) References Cited

U.S. PATENT DOCUMENTS

| | | | |
|---|---|---|---|
| 8,620,032 B2 * | 12/2013 | Zeng ................... | G08G 1/09623 382/104 |
| 10,029,696 B1 * | 7/2018 | Ferguson ............... | B60W 40/09 |
| 10,074,271 B1 * | 9/2018 | Gubarev .............. | G08G 1/0112 |
| 10,633,002 B1 * | 4/2020 | Ferguson .............. | B60W 50/14 |
| 10,661,795 B1 * | 5/2020 | Li ...................... | B60W 30/0956 |
| 2005/0128063 A1 * | 6/2005 | Isaji ...................... | B60W 40/10 340/439 |
| 2008/0094250 A1 * | 4/2008 | Myr ......................... | G08G 1/04 340/909 |

(Continued)

FOREIGN PATENT DOCUMENTS

JP 2017-087980 A 5/2017

*Primary Examiner* — Joseph H Feild
*Assistant Examiner* — Rufus C Point
(74) *Attorney, Agent, or Firm* — Sughrue Mion, PLLC

(57) ABSTRACT

A server of an information processing system receives, from each of the vehicles, a signal detection location where a traffic signal is detected by an imaging unit of each of the vehicles, and travel information at the signal detection location, calculates, based on the information from each of the vehicles, a mean distance L from the signal detection location to the traffic signal, and a mean speed S at the signal detection location, and evaluate a risk of the traffic signal based on at least the mean distance L and the mean speed S. The server then provides attention information to the vehicle approaching the traffic signal having the risk higher than a prescribed value.

7 Claims, 7 Drawing Sheets

(56) References Cited

U.S. PATENT DOCUMENTS

| | | | |
|---|---|---|---|
| 2012/0288138 A1* | 11/2012 | Zeng | G08G 1/09623 |
| | | | 382/103 |
| 2013/0311038 A1* | 11/2013 | Kim | G08G 1/0962 |
| | | | 701/36 |
| 2014/0330479 A1* | 11/2014 | Dolgov | B60W 30/143 |
| | | | 701/28 |
| 2015/0039350 A1* | 2/2015 | Martin | G08G 1/09626 |
| | | | 705/4 |
| 2016/0318490 A1* | 11/2016 | Ben Shalom | B60T 7/18 |
| 2017/0129401 A1 | 5/2017 | Matsuoka et al. | |
| 2017/0330455 A1* | 11/2017 | Kikuchi | G06K 9/00798 |
| 2017/0337810 A1* | 11/2017 | Abe | G01C 21/3492 |
| 2018/0349717 A1* | 12/2018 | Yamanoi | G08G 1/16 |
| 2018/0374345 A1* | 12/2018 | Suzuki | G08G 1/0112 |
| 2019/0035276 A1* | 1/2019 | Zruya | H04W 4/44 |
| 2019/0130198 A1* | 5/2019 | Hayashi | B60W 30/165 |
| 2019/0297526 A1* | 9/2019 | Das | H04W 4/06 |
| 2020/0082303 A1* | 3/2020 | Kim | G01C 21/3469 |

* cited by examiner

INFORMATION PROCESSING SYSTEM AND INFORMATION PROCESSING METHOD

INCORPORATION BY REFERENCE

The disclosure of Japanese Patent Application No. 2018-199414 filed on Oct. 23, 2018 including the specification, drawings and abstract is incorporated herein by reference in its entirety.

BACKGROUND

1. Technical Field

The present disclosure relates to information processing systems and information processing methods, and more particularly relates to an information processing system and an information processing method which evaluate a risk of a traffic signal and provide information on the risk.

2. Description of Related Art

It has been proposed to estimate traffic signal recognition failure at an intersection based on the operating state of a vehicle and warn a driver. For example, in Japanese Patent Application Publication No. 2017-87980, when an own vehicle is approaching an intersection where a traffic signal is red, a driver is depressing an accelerator pedal, and the speed of the vehicle exceeds a recognition failure determination speed, it is determined that there is a possibility of the driver failing to notice the red traffic signal, and red traffic signal recognition failure attention information is provided to the driver.

SUMMARY

The conventional driving support system is configured to determine that there is a possibility of a driver actually failing to notice a red traffic signal, and then provide the red traffic signal recognition failure attention information to the driver. The conventional driving support system, therefore, is effective to a certain extent for accident prevention. However, since the conventional system copes with a hazardous situation of traffic signal recognition failure after the situation occurs, the system is not configured to provide in advance the driver with the attention information that warns of the presence of a traffic signal that is prone to recognition failure for prevention of traffic signal recognition failure.

Therefore, an object of the present disclosure, made in view of the above-stated problem, is to provide an information processing system and an information processing method, capable of providing a vehicle (driver) with information indicating the presence of an approaching traffic signal that is prone to recognition failure.

An information processing system according to one embodiment of the present disclosure is an information processing system including a server configured to receive information from a plurality of vehicles. The server is configured to receive, from each of the vehicles, a signal detection location where a traffic signal is detected by an imaging unit in each of the vehicles, and travel information at the signal detection location, determine a distances from the signal detection location to the traffic signal, calculate, based on the information from each of the vehicles, a mean distance L from the signal detection location to the traffic signal, and a mean speed S at the signal detection location, evaluate a risk of the traffic signal based on at least the mean distance L and the mean speed S, and provide attention information to the vehicle approaching the traffic signal having the risk higher than a prescribed value.

An information processing method according to one embodiment of the present disclosure is an information processing method executed by an information processing system including a server configured to receive information from a plurality of vehicles. The method includes: the server receiving, from each of the vehicles approaching a traffic signal, a signal detection location where the traffic signal is detected by an imaging unit in each of the vehicles, and travel information at the signal detection location; the server determining a distance from the signal detection location to the traffic signal; the server calculating, based on the information from each of the vehicles, a mean distance L from the signal detection location to the traffic signal, and a mean speed S at the signal detection location; the server evaluating a risk of the traffic signal based on at least the mean distance L and the mean speed S; and the server providing attention information to the vehicle approaching the traffic signal having the risk higher than a prescribed value.

The present disclosure can provide information on the presence of a traffic signal that is prone to recognition failure to a vehicle (driver) approaching the traffic signal.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the present disclosure will be described hereinbelow with reference to the drawings.

Figure 1:
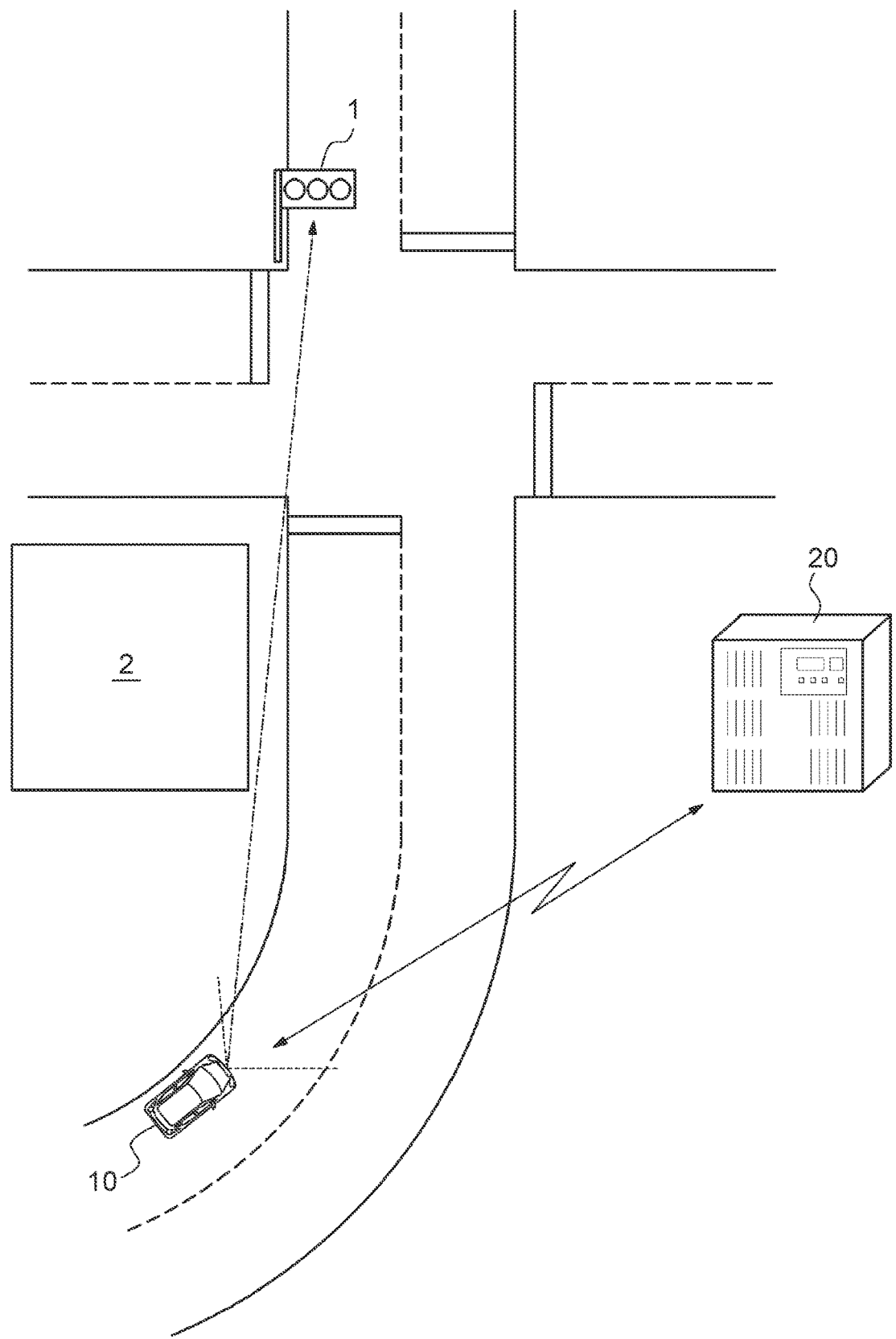
FIG. 1 is an explanatory view of a first example of evaluating the risk of a traffic signal.

FIG. 1 is an explanatory view of a first example of evaluating the risk of a traffic signal 1. FIG. 1 shows a vehicle 10 approaching an intersection (traffic signal 1), and a center (server) 20. The traffic signal 1 is installed in the intersection. Since an obstacle 2, such as a building, is present in the vicinity of the intersection, the forward view of the vehicle is narrowed. As a result, the traffic signal 1 is hardly recognized, that is, the traffic signal 1 is prone to recognition failure. In the present specification, the case where the traffic signal 1 is installed in an intersection is described as an example. However, without being limited to the intersection, the installation place of the traffic signal 1 may be any place in the present disclosure.

The vehicle 10 can analyze images (video images) of a front on-vehicle camera of the own vehicle, and detect the traffic signal 1. Here, the location where the traffic signal 1 is detected based on the images of the on-vehicle camera is identical to the position where a driver (driver) can recognize the traffic signal 1. When the vehicle 10 detects the traffic signal 1 based on the images of the front on-vehicle camera, the vehicle 10 transmits the signal detection location (vehicle location) where the traffic signal 1 is detected and travel information at the signal detection location to the center (server) 20. The travel information may include various pieces of information, including vehicle speed, acceleration, brake and accelerator statuses, and the location of the vehicle. In the present embodiment, the travel information includes at least the vehicle speed. Although only one vehicle 10 is displayed in FIG. 1, the vehicles 10 approaching the intersection (traffic signal 1) may each transmit the signal detection location where the traffic signal 1 is detected and the travel information (vehicle speed and the like) at the signal detection location to the server 20.

Based on the information (signal detection position) transmitted from the vehicle 10 approaching the traffic signal 1, the server 20 calculates a distance from the signal detection location where the traffic signal 1 is detected to the traffic signal 1. In the present disclosure, the term "distance to the traffic signal" does not refer to the distance to the installation location of the traffic signal. Rather, the term refers to a road travel distance o to a vehicle stop position (for example, a stop line) based on the traffic signal. Since the server 20 grasps the information on the location of the traffic signal 1 and road arrangement, the server 20 can calculate the distance (travel distance to the vehicle stop position) from the signal detection location to the traffic signal 1, if the signal detection location where the traffic signal 1 is detected can be obtained from the vehicle 10. When the calculated travel distances of the vehicles 10 are averaged, a mean distance L from the signal detection location to the traffic signal 1 can be obtained. Similarly, when the pieces of travel information (vehicle speeds) at the signal detection locations from the vehicles 10 are averaged, a mean speed S at the signal detection location can be obtained.

As the mean distance L from the signal detection location to the traffic signal 1 is shorter, the traffic signal 1 is evaluated as a traffic signal that is harder to recognize (more prone to recognition failure), and a risk evaluation value thereof is set to be higher. As the mean speed S at that time is higher, the traffic signal 1 is evaluated as a traffic signal at which the vehicle is harder to stop, and the risk evaluation value thereof is set to be higher. Based on the correlation between the mean distance L and the mean speed S, the risk of the traffic signal 1 is evaluated.

More specifically, the risk is evaluated based on whether the vehicle can safely stop at or before the vehicle stop position of the traffic signal 1 after the traffic signal (red traffic signal) 1 is detected. For example, even when the mean distance L from the signal detection location to the traffic signal 1 is relatively short, the risk may be evaluated to be low in the case where the mean speed S at the signal detection location is sufficiently low (such as when the road has a low speed limit, or when the road has a up slope, which causes a natural speed reduction). On the contrary, even when the mean distance L from the signal detection location to the traffic signal 1 is relatively long, the risk is evaluated to be high in the case where the mean speed S at the signal detection location is high due to down slope or the like.

Therefore, the risk R can be obtained, for example, by an evaluation expression (1) below.

$$R = aS^{\alpha}/L^{\beta} \quad (1)$$

Here, a is a positive coefficient, and $\alpha$, $\beta$ are positive index parameters. These figures can experimentally be set in a suitable manner based on the methods of evaluation. The evaluation expression is not limited to the expression (1). It is possible to use an evaluation function which produces a larger risk R as the mean distance L is shorter and the mean speed S is higher.

Thus, the information processing system statistically processes the information from each of the vehicles, and evaluates the risk R of the traffic signal 1 (hardness to view the traffic signal). The information processing system performs such evaluation for each of the traffic signals included in a management area of the information processing system, and collects data and evaluates the risk R for each of the traffic signals. The information processing system then stores the evaluation value of the risk R for each of the traffic signals. The information processing system may identify and store the traffic signals having the evaluation value of the risk R higher than a prescribed value (risk determination threshold), as hazardous traffic signals that are prone to recognition failure.

Figure 2:
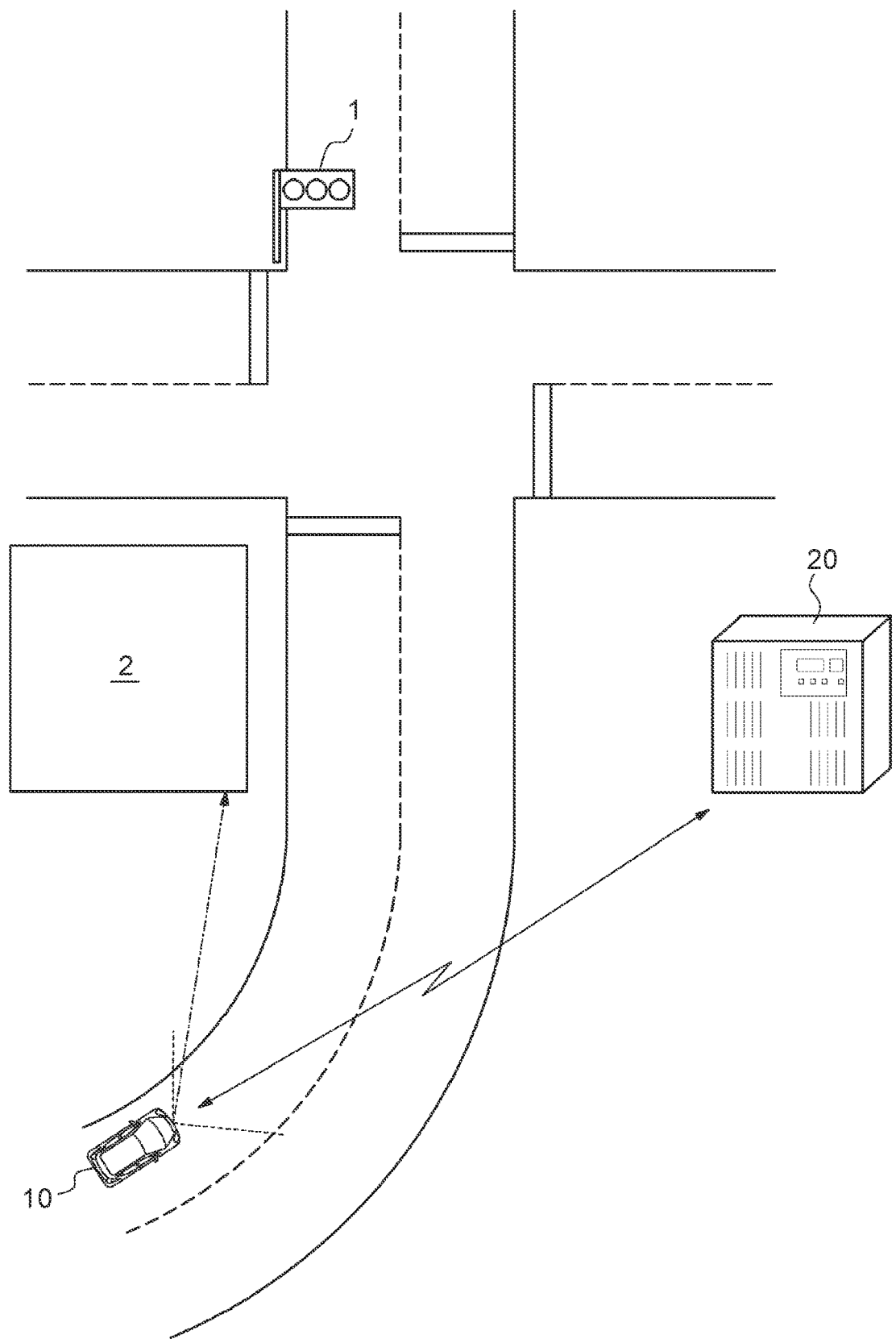
FIG. 2 shows the state of providing attention information to a vehicle approaching a traffic signal.

FIG. 2 shows the state of providing attention information to a vehicle approaching the intersection (traffic signal 1). FIG. 2 shows the center (server) 20 and the vehicle 10 approaching the intersection (traffic signal 1).

When the server 20 detects the vehicle 10 approaching the traffic signal 1, the server 20 determines whether the traffic signal 1 is a hazardous traffic signal that is prone to recognition failure, based on the evaluation value of the risk R of the traffic signal 1. The server 20 may perform the determination in advance. When the traffic signal 1 is a hazardous traffic signal that is prone to recognition failure, the server 20 provides the vehicle 10 approaching the traffic signal 1 with the information on the traffic signal that is prone to recognition failure (such as the presence of the intersection, the presence of the traffic signal, or the traffic signal being red) as attention information, before the vehicle 10 reaches the position where the traffic signal 1 is actually visible from the vehicle 10. This makes it possible to draw the attention of the vehicle 10 (driver) to prevent a failure to notice the traffic signal 1, and to prevent an accident caused by the failure to notice the traffic signal 1 at the intersection or the like.

Figure 3:
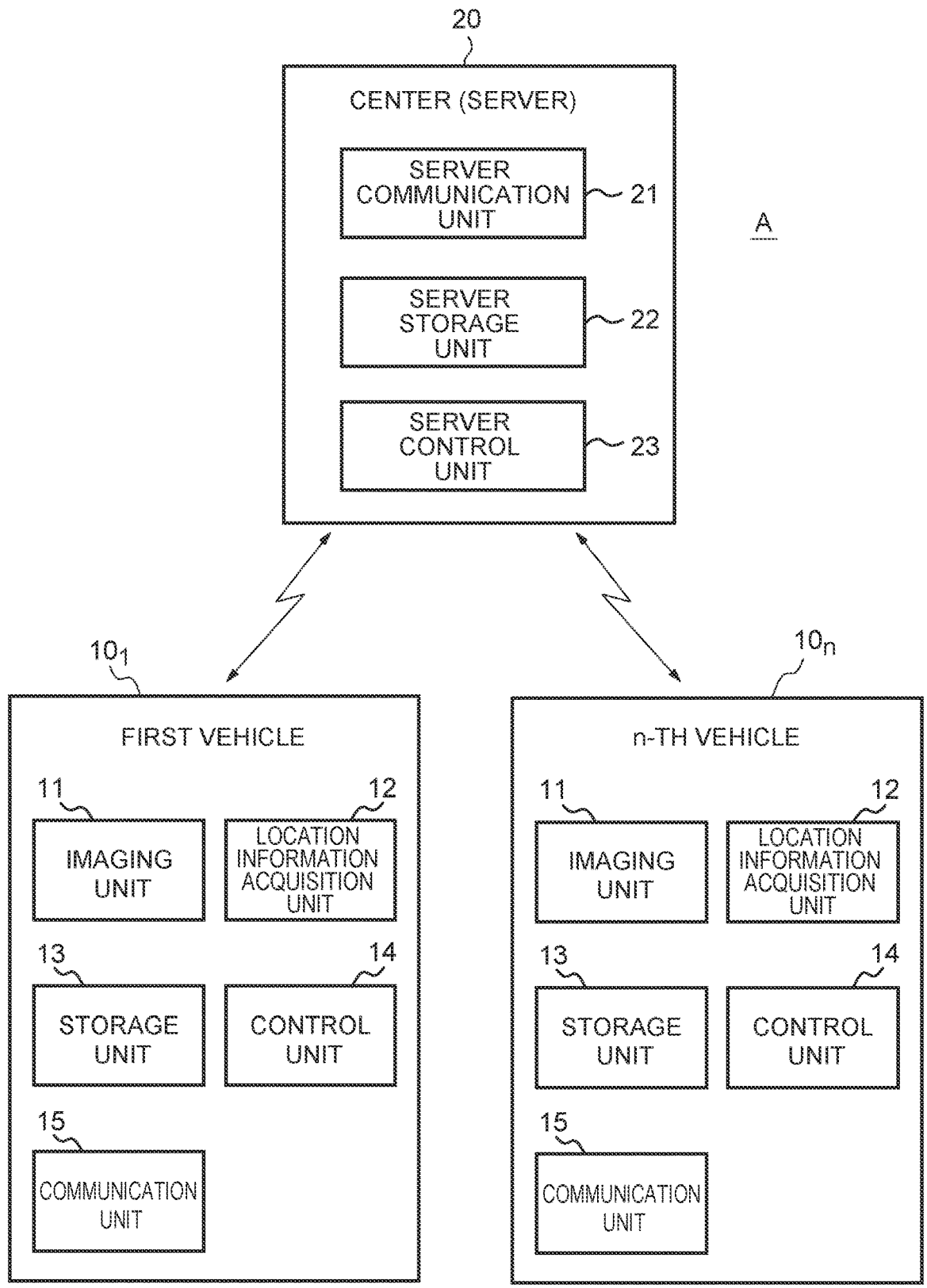
FIG. 3 is an overall view of an example of an information processing system in one embodiment.

Description is now given of an information processing system A which evaluates the risk of the traffic signal 1. FIG. 3 is an overall view of an example of the information processing system A in one embodiment of the present disclosure. The information processing system A includes the center (server) 20. The server 20 receives information from the vehicles 10 (a first vehicle $10_1$, . . . an n-th vehicle $10_n$).

The vehicles 10 ($10_1$, . . . $10_n$) include an imaging unit 11, a location information acquisition unit 12, a storage unit 13, a control unit 14, and a communication unit 15. Since the configuration of each of the vehicles 10 is identical, only the first vehicle $10_1$ will be described.

The imaging unit 11 is what is called an on-vehicle camera. Here, the imaging unit 11 includes a camera which takes images in front of (outside) the vehicle. The imaging unit 11 is preferably a drive recorder which generates continuous video images in front of the vehicle during driving or during stop, and records the generated video images in the storage unit 13. The imaging unit 11 generates video images including the traffic signal 1, when the vehicle approaches the traffic signal 1.

The location information acquisition unit 12 includes one or more receivers corresponding to any global positioning system. For example, the location information acquisition unit 12 may also include a global positioning system (GPS) receiver. The location information acquisition unit 12 detects the information on the location of the own vehicle (particularly a signal detection location where the traffic signal 1 is detected).

The storage unit 13 is a device which records and stores various pieces of information. The storage unit 13 includes one or more memories. Although examples of the "memory" include a semiconductor memory, a magnetic memory, or an optical memory, the memory is not limited to these. The memory or memories included in the storage unit 13 may each function as a main storage, an auxiliary storage, or a cache memory, for example. The storage unit 13 stores any information related to operation of the first vehicle 10. For example, the storage unit 13 associates the video images generated in the imaging unit 11, or the location information acquired in the location information acquisition unit 12 with time information when they are generated. The storage unit 13 also stores information on the result of processing and analyzing the generated video images in the control unit 14. The storage unit 13 further accumulates various pieces of information with regard to operation and control of the vehicle, such as storing the vehicle control program of the own vehicle.

The control unit 14 includes one or more processors. The "processor" may be a general-purpose processor or an exclusive processor dedicated for specific processing. For example, an electronic control unit (ECU) mounted on the first vehicle 10 may function as the control unit 14. The control unit 14 controls the operation of the entire first vehicle. For example, the control unit 14 performs control of the imaging unit 11, the location information acquisition unit 12, the storage unit 13, and the communication unit 15, and also performs all the control with regard to traveling and operation of the own vehicle. The control unit 14 can perform image analysis. The control unit 14 analyzes the video images generated in the imaging unit 11, and detects the traffic signal 1.

The communication unit 15 includes a communication module which performs communication between the own vehicle and the server 20. The communication unit 15 may include a communication module connected to a network, or a communication network in conformity with mobile object communication standards, such as 4th generation (4G) and 5th generation (5G) mobile object communication standards. For example, an on-board communication device, such as a data communication module (DCM) mounted on the first vehicle 10, may function as the communication unit 15. The vehicle 10 includes a speed indicator or an accelerometer. The communication unit 15 can transmit, in addition to the information on the location of the vehicle, travel information (vehicle speed, acceleration, accelerator and brake statuses, or the like) to the server 20.

The center (server) 20 includes a server communication unit 21, a server storage unit 22, and a server control unit 23.

The server communication unit 21 includes a communication module which performs communication between the server 20 and the vehicle 10. The server communication unit 21 may include a communication module connected to the network. The server communication unit 21 can receive information (signal detection location information, travel information, or the like) transmitted from the vehicles 10 (the first vehicle $10_1$, . . . the n-th vehicle $10_n$). The server communication unit 21 can also transmit (provide) information (attention information) indicating the presence of the traffic signal 1 to the vehicle 10 approaching the hazardous traffic signal 1.

The server storage unit 22 is a device which records and stores various pieces of information. The server storage unit 22 includes one or more memories. Although examples of the "memory" include a semiconductor memory, a magnetic memory, or an optical memory, the memory is not limited to these. The memory or memories included in the server storage unit 22 may each function as a main storage, an auxiliary storage, or a cache memory, for example. The server storage unit 22, for example, accumulates the information (signal detection location information, travel information, or the like) transmitted from the vehicles 10 (the first vehicle $10_1$, . . . the n-th vehicle $10_n$). The server storage unit 22 also stores information on the result of processing and analyzing the received information in the server control unit 23. The server storage unit 22 further accumulates various pieces of information with regard to operation and control of the server and the entire system.

The server control unit 23 includes one or more processors. The "processor" may be a general-purpose processor or an exclusive processor dedicated for specific processing. The server control unit 23 performs control of the server communication unit 21 and the server storage unit 22, and also performs all the control with regard to the operation of the server and the entire system. For example, the server control unit 23 analyzes the information (signal detection location information, travel information, or the like) transmitted from the vehicles 10 (the first vehicle $10_1$, . . . the n-th vehicle $10_n$), and evaluates the risk of the traffic signal 1.

Figure 4:
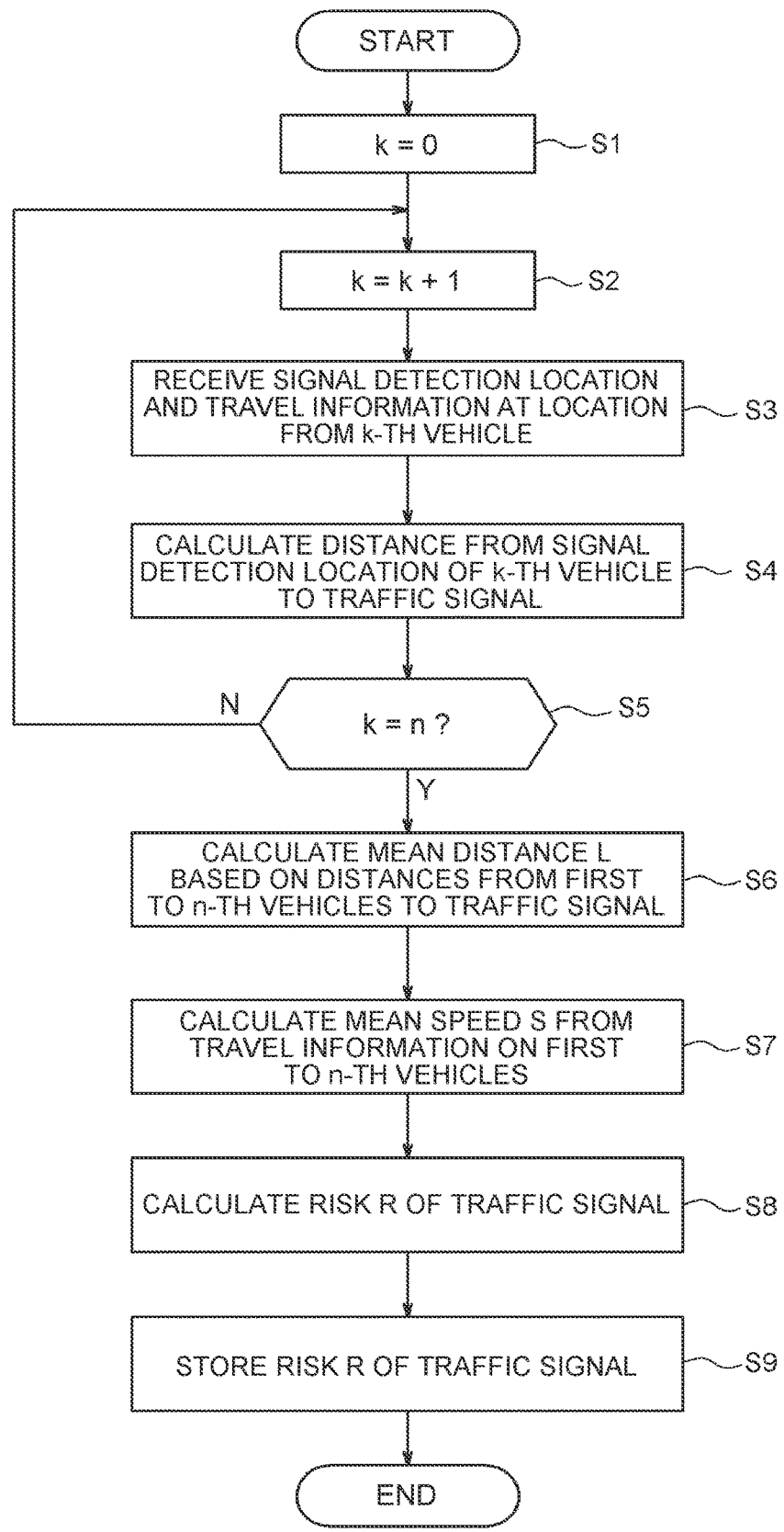
FIG. 4 is a (first) flowchart of the operation of the information processing system of one embodiment.

Description is now given of the operation of the information processing system A. FIG. 4 is a (first) flowchart of the operation of the information processing system A in one embodiment of the present disclosure. The flowchart shows the procedures of the first example of evaluating the risk of a traffic signal. Each of the steps is executed by the server 20 unless otherwise specified.

Step 1 (S1): set k=0 as default. Here, k represents the number of the vehicles 10. When the information from at least n vehicles 10 is accumulated, the server 20 evaluates the risk of the traffic signal 1.

Step 2 (S2): add one to the value (number) of k.

Step 3 (S3): the server 20 receives a signal detection location, and travel information (vehicle speed or the like) at the location (signal detection location) from the k-th vehicle 10 approaching the traffic signal 1 through the server communication unit 21. The received information is accumulated in the server storage unit 22.

Step 4 (S4): the server 20 calculates a distance from the signal detection location of the k-th vehicle 10 to the traffic signal 1 with the server control unit 23. In calculation of the distance, the server 20 can read the information, such as the information on the vehicle stop position with regard to the traffic signal 1 and the road arrangement, from the server storage unit 22, and use the read information.

Step 5 (S5): determine whether the number k of the vehicles 10 reaches n. When the number k reaches n, the processing proceeds to step 6. When the number k does not reach n, the processing returns to step 2.

Step 6 (S6): the server 20 averages the distances from the signal detection locations of the first to n-th vehicles 10 to the traffic signal 1 to calculate a mean distance L with the server control unit 23.

Step 7 (S7): the server 20 averages the vehicle speeds in the travel information on the first to n-th vehicles 10 to calculate a mean speed S with the server control unit 23.

Step 8 (S8): calculate (evaluate) the risk R of the traffic signal 1 based on at least the mean distance L and the mean speed S.

Step 9 (S9): the server 20 stores the evaluated risk R of the traffic signal 1 in the server storage unit 22. The server 20 then ends the procedures for risk evaluation.

The server 20 similarly evaluates the risk R of each traffic signal within its system management area, and stores the evaluated risk R in the server storage unit 22. In addition to storing the evaluation value of the risk R of each traffic signal, the server 20 may also identify and store traffic signals having an evaluation value of the risk R higher than a prescribed value as hazardous traffic signals that are prone to recognition failure. Even after evaluating the risk R based on n vehicles 10, the server 20 may further collect the information from the vehicles 10 and update the evaluated risk R.

Figure 5:
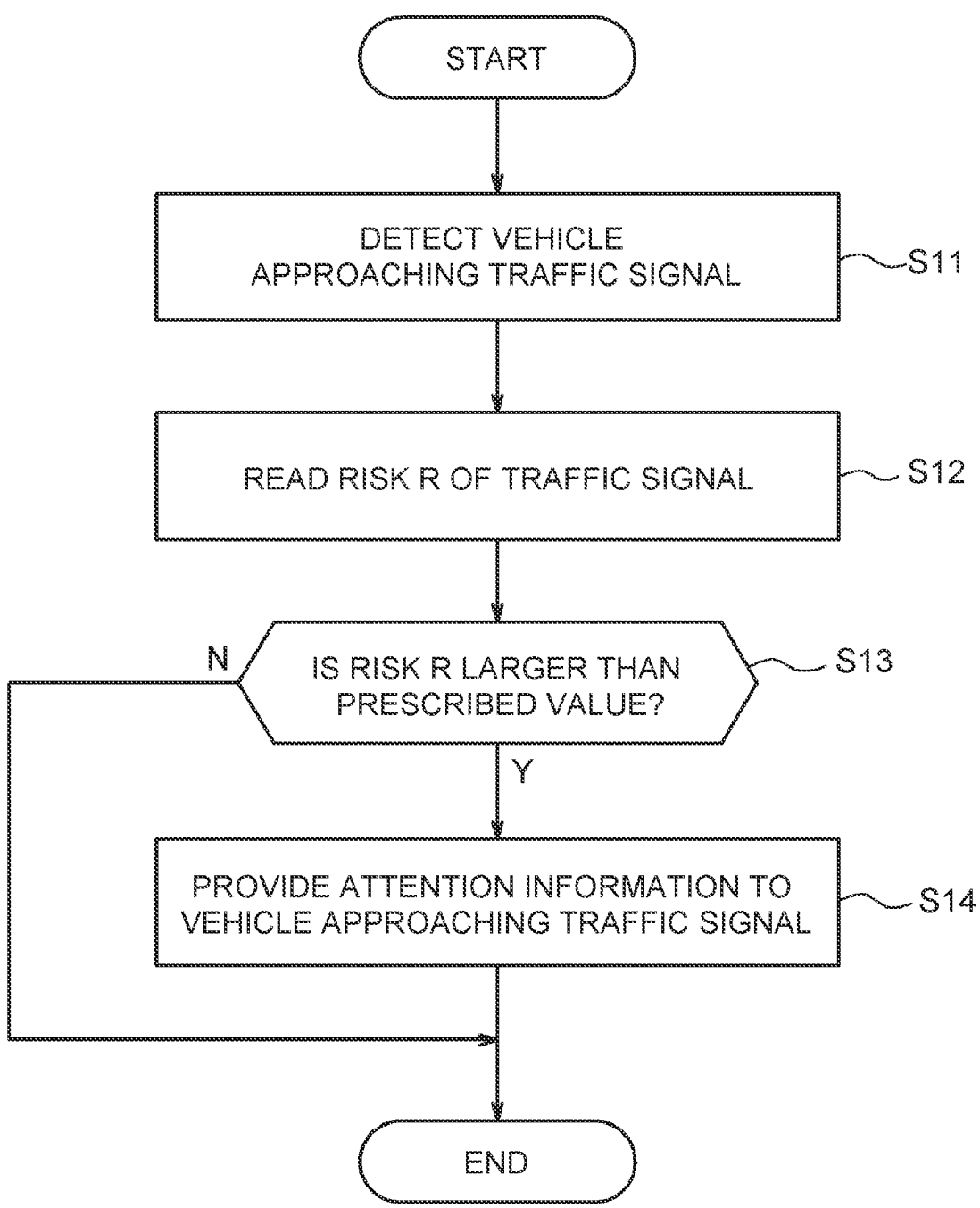
FIG. 5 is a (second) flowchart of the operation of the information processing system of one embodiment.

Description is now given of the operation of providing attention information by the information processing system A. FIG. 5 is a (second) flowchart of the operation of the information processing system A in one embodiment of the present disclosure. FIG. 5 shows the procedures for providing the attention information. Each of the steps is executed by the server 20 unless otherwise specified.

Step 11 (S11): the server 20 detects the vehicle 10 approaching the traffic signal 1. The server 20 can grasp the locational relationship between the vehicle 10 and the traffic signal 1 by receiving information on the location of the vehicle 10 through the server communication unit 21.

Step 12 (S12): the server 20 reads the risk R (evaluation value) of the traffic signal 1 from the server storage unit 22.

Step 13 (S13): determine whether the evaluation value of the risk R of the traffic signal 1 is larger than a prescribed value (risk determination threshold). When the evaluation value is larger than the prescribed value, the process proceeds to step 14. When the evaluation value is smaller than the prescribed value, the process is ended. In the case of determining, in advance, whether or not the traffic signals have an evaluation value of the risk R that is higher than a prescribed value, and identifying and storing the traffic signals having the evaluation value larger than the prescribed value as hazardous traffic signals that are prone to recognition failure, the server 20 may read and use the read information on the identified hazardous traffic signals.

Step 14 (S14): provide attention information (for example, the presence of the intersection, the presence of the traffic signal, or the traffic signal being red) to the vehicle (driver) 10 approaching the traffic signal 1. Then, the process is ended.

Although the configuration and operation of the information processing system A have been described based on the flowchart, the present disclosure may be configured as an information processing method. More specifically, the present disclosure may be configured as an information processing method executed by an information processing system including the server 20 configured to receive information from a plurality of vehicles. The method may include: the server 20 receiving, from each of the vehicles 10 approaching the traffic signal 1, a signal detection location where the traffic signal 1 is detected by the imaging unit 11 in each of the vehicles 10, and travel information at the signal detection locations; the server 20 determining a distance from the signal detection location to the traffic signal 1; the server 20 calculating, based on the information from each of the vehicles 10, a mean distance L from the signal detection location to the traffic signal 1, and a mean speed S at the signal detection location; the server 20 evaluating the risk R of the traffic signal 1 based on at least the mean distance L and the mean speed S, and the server 20 providing attention information to the vehicle 10 approaching the traffic signal 1 having the risk R higher than a prescribed value.

Figure 6:
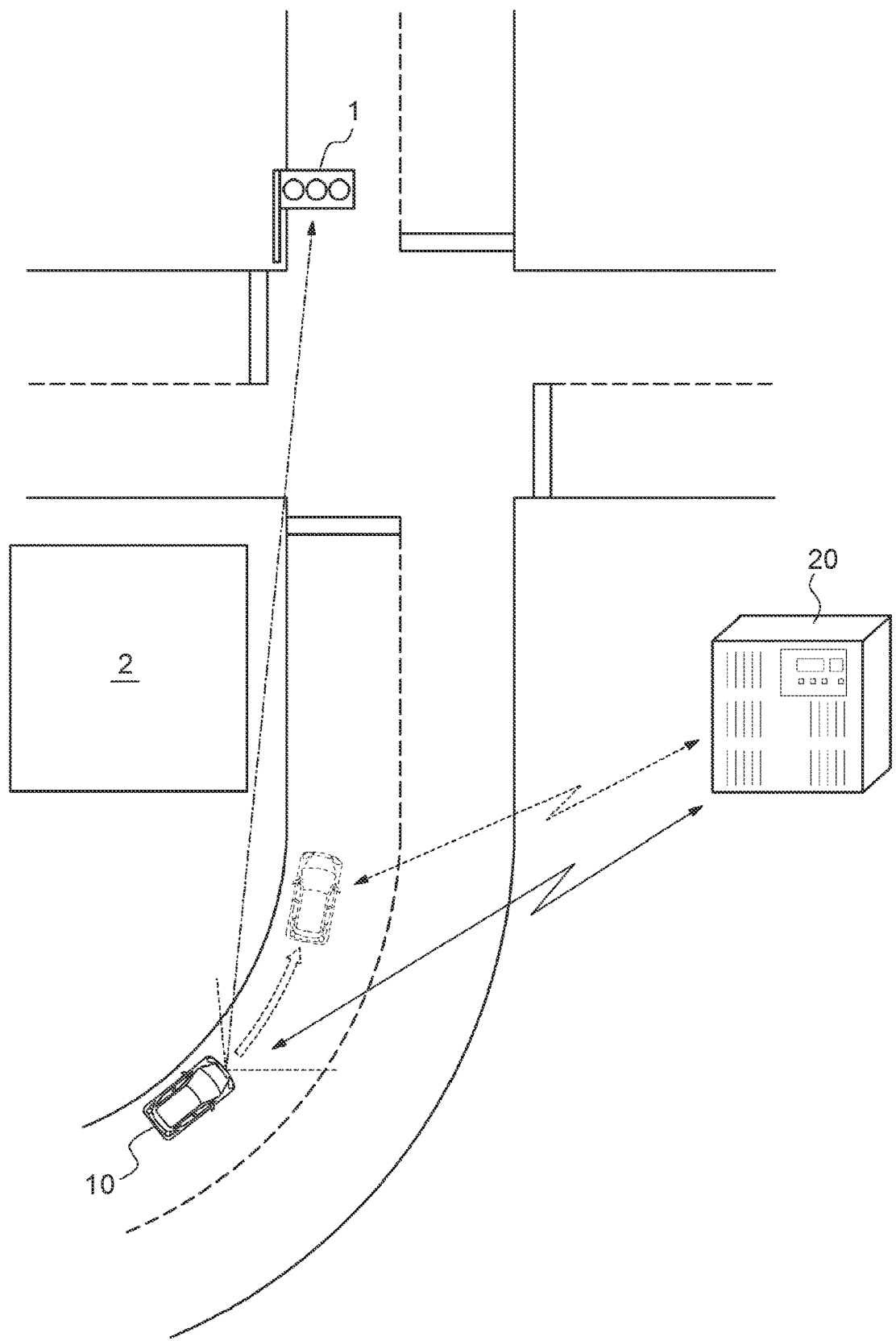
FIG. 6 is an explanatory view of a second example of evaluating the risk of a traffic signal.

FIG. 6 is an explanatory view of a second example of evaluating the risk of the traffic signal 1. FIG. 6 shows the vehicle 10 approaching an intersection (traffic signal 1), and the center (server) 20. FIG. 6 is similar to FIG. 1 in that the obstacle 2, such as a building, is present in the vicinity of the intersection, and the traffic signal 1 is hardly recognized, that is, the traffic signal 1 is prone to recognition failure. The second example is different from the first example in that a brake operation of the vehicle 10 is also used for evaluation.

When the vehicle 10 detects the traffic signal 1 based on the images (video images) of the front on-vehicle camera of the own vehicle, the vehicle 10 transmits a signal detection location (vehicle location) where the traffic signal 1 is detected and travel information (such as vehicle speed) at the signal detection location to the server 20 from the own vehicle 10. In FIG. 6, when urgent braking is made during the travel from the signal detection location of the traffic signal 1 to the traffic signal 1 (vehicle stop position based on the traffic signal 1), the urgent braking is transmitted as urgent braking information to the server 20, in addition to the signal detection location of the traffic signal 1 and the vehicle speed at the signal detection location. The braking information may be included in the travel information. The condition for recognizing the urgent braking can suitably be set. For example, the urgent braking is recognized when an acceleration of more than 0.3 G is produced.

As in the first example, the server 20 calculates, based on the information transmitted from each of the vehicles 10 approaching the traffic signal 1, a mean distance L from the signal detection location to the traffic signal 1, and a mean speed S at the signal detection location. The server 20 further calculates urgent braking frequency B indicating the number of vehicles, among the vehicles 10, that made urgent braking.

As described before, as the mean distance L from the signal detection location to the traffic signal 1 is shorter, and as the mean speed S at that time is higher, the traffic signal 1 is evaluated as a traffic signal at which the vehicle is harder to stop, and the risk evaluation value thereof is set higher. In addition, as the urgent braking frequency B is larger, the traffic signal 1 is evaluated as a more hazardous traffic signal, and the risk evaluation value thereof is set higher. Based on the correlation of these elements, the risk of the traffic signal 1 is evaluated.

Therefore, the risk R can be obtained by a subsequent evaluation expression (2), where L is a mean distance from the signal detection location to the traffic signal, S is a mean speed S at the signal detection location, and B is urgent braking frequency.

$$R = aS^{\alpha}/L^{\beta} + bB \qquad (2)$$

Here, a, b are positive coefficients, and $\alpha$, $\beta$ are positive index parameters. These figures can experimentally be set in a suitable manner based on the methods of evaluation. The evaluation expression is not limited to the expression (2). It is possible to use an evaluation function which produces a larger risk R as the mean distance L is shorter, the mean speed S is higher, and the urgent braking frequency B is larger.

In the second example, the urgent braking frequency B indicating the number of vehicles, among the vehicles 10, that made urgent braking is added as an element of evaluation. However, the urgent braking frequency B as an element of evaluation may be replaced with traffic signal recognition failure frequency B'.

The server 20 analyzes the travel information from the vehicles 10, and determines whether or not there is a failure to notice the traffic signal 1. Specifically, for example, the server 20 constantly acquires information on the color of the traffic signal 1, and the travel information on the vehicles 10. The server 20 determines that the driver has not noticed the red traffic signal, when the traffic signal 1 is red at the location where the vehicle (driver) 10 can recognize the traffic signal 1, the speed of the vehicle 10 exceeds a prescribed value which enables the vehicle to stop safely, and the accelerator pedal is detected to be depressed. The server 20 then calculates the red traffic signal recognition failure frequency B' indicating the number of vehicles, among the vehicles 10, that failed to notice the red traffic signal. The red traffic signal recognition failure frequency B' may be replaced with the urgent braking frequency B in the expression (2).

The operation of the information processing system A in the second example can similarly be described based on the flowchart of FIG. 4, in which a step of calculating the urgent braking frequency B (or red traffic signal recognition failure frequency B') from the travel information on the first vehicle to n-th vehicle is added after step 7.

Figure 7:
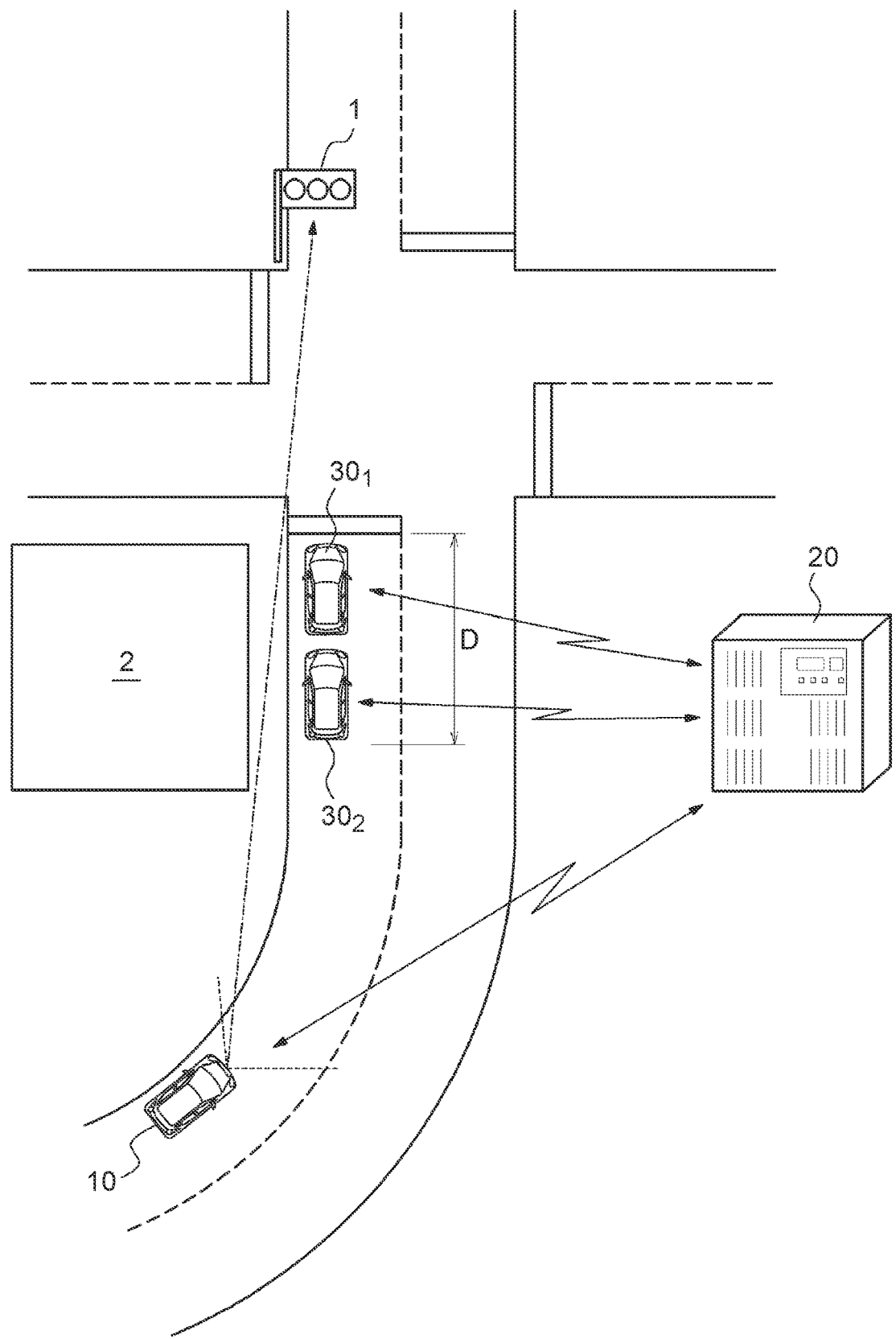
FIG. 7 is an explanatory view of a third example of evaluating the risk of a traffic signal.

FIG. 7 is an explanatory view of a third example of evaluating the risk of the traffic signal 1. FIG. 7 shows the vehicle 10 approaching an intersection (traffic signal 1), and the center (server) 20. FIG. 7 is similar to FIG. 1 in that the obstacle 2, such as a building, is present in the vicinity of the intersection, and the traffic signal 1 is hardly recognized, that is, the traffic signal 1 is prone to recognition failure. The third example is different from the first and second examples in that the evaluation function is modified to include the presence of a line of forward vehicles waiting for signals at the intersection (traffic signal 1) as an element of evaluation.

When the vehicle 10 detects the traffic signal 1 based on the images (video images) of the front on-vehicle camera of the own vehicle, the vehicle 10 transmits a signal detection location (vehicle location) where the traffic signal 1 is detected and travel information (such as vehicle speed) at the signal detection location to the server 20 from the own vehicle 10.

Based on the information transmitted from the vehicle 10 approaching the traffic signal 1, the server 20 calculates a distance from the signal detection location where the traffic signal 1 is detected to the traffic signal 1. The server 20 also acquires the travel information on vehicles 30 ($30_1$, $30_2$ . . . ) which stop and wait for signals at the intersection (traffic signal 1). The travel information includes the location of the vehicle, and the vehicle speed (including a speed of zero). Accordingly, by combining the traveling information with the information on the location of the traffic signal (which is part of the traffic information), the server 20 can grasp how many vehicles 30 stop at the traffic signal 1 and form a line of vehicles waiting for the signals. The server 20 then calculates the magnitude of the length of the vehicle line based on the general length of the vehicles.

Even when there is distance from the signal detection location to the traffic signal 1, the vehicle 10 needs to stop by the time the vehicle 10 reaches a line of forward vehicles during stop. Hence, the distance allowed for the vehicle 10 to use for stop is a distance resulting from subtracting "the length of the forward vehicles" from "the distance from the signal detection location to the traffic signal 1." Accordingly, the server 20 calculates a length D of an average line of the vehicles 30 waiting for the traffic signal 1, and uses the mean vehicle line length D as a correction value of the mean distance L from the signal detection location to the traffic signal 1.

More specifically, the distance (L–D) resulting from subtracting the mean vehicle line length D from the mean distance L from the signal detection location to the traffic signal 1 is used for evaluation. As the (L–D) is shorter, the traffic signal 1 is evaluated as a traffic signal at which the vehicle is harder to stop safely, and the risk evaluation value thereof is set to be higher. As the mean speed S at that time is higher, the traffic signal 1 is evaluated as a traffic signal at which the vehicle is harder to stop, and the risk evaluation value thereof is set to be higher. Based on the correlation of these elements, the risk of the traffic signal 1 is evaluated.

Therefore, the risk R can be obtained by modifying the evaluation expression (1) into a subsequent evaluation expression (3).

$$R = aS^\alpha/(L-D)^\beta \tag{3}$$

Alternatively, the risk R may be obtained by modifying the evaluation expression (2) into a subsequent evaluation expression (4).

$$R = aS^\alpha/(L-D)^\beta + bB \tag{4}$$

Here, a, b are positive coefficients, and $\alpha$, $\beta$ are positive index parameters. These figures can experimentally be set in a suitable manner based on the methods of evaluation. The evaluation expression (3) or (4) can evaluate the risk more correctly.

The operation of the information processing system A in the third example can similarly be described based on the flowchart of FIG. 4, in which a step of calculating the mean vehicle line length D from the travel information on the vehicles during stop is added to any stages, and the distance (L–D) resulting from subtracting the mean vehicle line length D from the mean distance L is used for evaluation in step (S8) of calculating the risk R of the traffic signal.

According to the present disclosure, the driver can be notified in advance of the information on a traffic signal that is prone to recognition failure (the presence of an intersection, the presence of the traffic signal, or the red traffic signal) as attention information. As a result, urgent braking and rear-end accidents can be prevented, which can contribute to reduction in traffic accidents.

Although the configuration and operation of the information processing system A have been described in the above embodiment, the present disclosure is not limited to these. For example, a general-purpose information processing apparatus, such as a smartphone or a computer, may be configured to function as the imaging unit 11, the location information acquisition unit 12, the storage unit 13, the control unit 14, the communication unit 15, or the server 20 according to the embodiment disclosed. Specifically, a program describing the contents of processes which implement each function of the imaging unit 11, and other component members according to the embodiments is stored in the memory of an information processing apparatus, and the program is read and executed by a processor of the information processing apparatus. Therefore, the disclosure according to the embodiment may be implemented as a program executable by the processor.

Although an embodiment has been described as a typical example, it is clear to those skilled in the art that many changes and replacements are possible within the scope and the range of the present disclosure. Therefore, it should be understood that the present disclosure is not limited to the embodiment disclosed, and various modifications and changes are possible without departing from the claims. For example, a plurality of configuration blocks shown in the embodiment may be combined, or one configuration block may be divided.

What is claimed is:

1. An information processing system, comprising a server configured to receive information from a plurality of vehicles, wherein
the server is configured to
receive, from each of the vehicles, a signal detection location where a traffic signal is detected by an imaging unit in each of the vehicles, and travel information at the signal detection location,
determine a distance from the signal detection location to the traffic signal,
calculate, based on the information from each of the vehicles, a mean distance L from the signal detection location to the traffic signal, and a mean speed S at the signal detection location,
evaluate a risk of the traffic signal based on at least the mean distance L and the mean speed S, and
provide attention information to the vehicle approaching the traffic signal having the risk higher than a prescribed value.

2. The information processing system according to claim 1, wherein an evaluation value of the risk is set to be higher as the mean distance L is shorter and/or the mean speed S is higher.

3. The information processing system according to claim 1, wherein
the server is configured to
receive, from each of the vehicles, urgent braking information indicating that urgent braking is made during travel from the signal detection location to the traffic signal,
calculate urgent braking frequency B based on the urgent braking information from each of the vehicles, and
evaluate the risk of the traffic signal based on at least the mean distance L, the mean speed S, and the urgent braking frequency B.

4. The information processing system according to claim 1, wherein
the server is configured to
calculate a mean vehicle line length D at the traffic signal, based on the travel information on each of the vehicles that stop at the traffic signal, and
use, in place of the mean distance L, a distance (L D) resulting from subtracting the mean vehicle line length D from the mean distance L for evaluation when evaluating the risk of the traffic signal.

5. An information processing method executed by an information processing system including a server configured to receive information from a plurality of vehicles, the method comprising:
the server receiving, from each of the vehicles approaching a traffic signal, a signal detection location where the traffic signal is detected by an imaging unit in each of the vehicles, and travel information at the signal detection location;
the server determining a distance from the signal detection location to the traffic signal;
the server calculating, based on the information from each of the vehicles, a mean distance L from the signal detection location to the traffic signal, and a mean speed S at the signal detection location;
the server evaluating a risk of the traffic signal based on at least the mean distance L and the mean speed S; and
the server providing attention information to the vehicle approaching the traffic signal having the risk higher than a prescribed value.

6. The information processing system according to claim 1, wherein the server is further configured to store the evaluated risk of the traffic signal.

7. The information processing system according to claim 1, wherein the risk of the traffic signal is evaluated based on the traffic signal being in the vicinity of a building.

* * * * *